US012723449B2

(12) United States Patent
Rudolf

(10) Patent No.: US 12,723,449 B2
(45) Date of Patent: Sep. 1, 2026

(54) ACTUATING MECHANISM FOR ACTUATING COVERS FOR VEHICLES

(71) Applicant: Illinois Tool Works Inc., Glenview, IL (US)

(72) Inventor: Andreas Rudolf, Eibelstadt (DE)

(73) Assignee: Illinois Tool Works Inc., Glenview, IL (US)

( * ) Notice: Subject to any disclaimer, the term of this patent is extended or adjusted under 35 U.S.C. 154(b) by 613 days.

(21) Appl. No.: 18/130,710

(22) Filed: Apr. 4, 2023

(65) Prior Publication Data

US 2023/0340810 A1 Oct. 26, 2023

(30) Foreign Application Priority Data

Apr. 26, 2022 (DE) ......................... 102022110008.1

(51) Int. Cl.
*E05B 85/10* (2014.01)

(52) U.S. Cl.
CPC .......... *E05B 85/103* (2013.01); *E05B 85/107* (2013.01)

(58) Field of Classification Search
CPC ....... E05B 85/10; E05B 85/103; E05B 85/107
See application file for complete search history.

(56) References Cited

U.S. PATENT DOCUMENTS 681,075 A 8/1901 Perkins
1,081,319 A 12/1913 Ernest
3,034,802 A 5/1962 Axtmann
3,712,362 A 1/1973 Alderfer
4,867,501 A 9/1989 Nomura
6,923,481 B2 8/2005 Bruderick
7,062,945 B2 6/2006 Saitoh
7,404,588 B2 7/2008 Gabsch
7,621,573 B2 11/2009 Thomas
8,089,228 B2 1/2012 Ballard
8,443,553 B1 5/2013 Polewarczyk
9,062,478 B2 6/2015 Bingle
9,156,335 B1 10/2015 Harter
9,458,649 B2 * 10/2016 Fujiwara ................ E05B 81/56

(Continued)

FOREIGN PATENT DOCUMENTS

CN 108843162 A 11/2018
CN 108979368 A 12/2018

(Continued)

*Primary Examiner* — Carlos Lugo
(74) *Attorney, Agent, or Firm* — McAndrews, Held & Malloy, Ltd.

(57) ABSTRACT

An actuating mechanism for actuating a cover in a vehicle, wherein the cover is reversibly movable, between a closed position and an opened position, wherein the actuating mechanism comprises: a drive, having a drive shaft; and a kinematics associated with the drive, which kinematics is configured so as to tap a rotational movement from the drive shaft when the drive is actuated and convert it into a movement of the cover, wherein the kinematics is associated with a coupling. The coupling has a normal state, in which a torque of the drive shaft is transferred to the cover continuously increasing up to a first torque threshold, and an emphatic state, in which the torque of the drive shaft is transferred to the cover abruptly up to a second torque threshold, wherein the second torque threshold is higher than the first torque threshold.

18 Claims, 8 Drawing Sheets

100

(56) References Cited

U.S. PATENT DOCUMENTS

| | | | | |
|---|---|---|---|---|
| 9,643,487 | B2 | 5/2017 | Szawarski | |
| D806,513 | S | 1/2018 | Curic | |
| 10,052,947 | B2 | 8/2018 | Herrmann | |
| 10,053,893 | B1 | 8/2018 | Patel | |
| 10,253,533 | B1 * | 4/2019 | Pudney | E05F 1/1016 |
| 10,435,924 | B1 * | 10/2019 | Salter | E05B 81/78 |
| 10,577,845 | B2 | 3/2020 | Herczeg | |
| 10,615,534 | B2 | 4/2020 | Herczeg | |
| 10,655,371 | B2 | 5/2020 | Soonthornwinate | |
| 10,711,494 | B2 | 7/2020 | Bingle | |
| 10,760,307 | B2 * | 9/2020 | Rocci | E05B 85/107 |
| 10,884,316 | B2 | 1/2021 | Yoshizawa | |
| 10,897,936 | B2 | 1/2021 | Berger | |
| 10,934,748 | B2 | 3/2021 | Harajli | |
| 10,941,603 | B2 | 3/2021 | Linden | |
| 10,988,962 | B2 | 4/2021 | Park | |
| 11,027,646 | B2 | 6/2021 | Kothe | |
| 11,040,615 | B2 | 6/2021 | Herzig | |
| 11,085,212 | B2 | 8/2021 | Rivaya | |
| 11,244,321 | B2 | 2/2022 | Wu | |
| 11,248,403 | B2 * | 2/2022 | Boberschmidt | E05B 85/103 |
| 11,479,995 | B2 | 10/2022 | Löw | |
| 11,553,887 | B2 | 1/2023 | McLaughlin | |
| 11,560,741 | B2 * | 1/2023 | Guerin | E05B 85/107 |
| 11,821,245 | B2 | 11/2023 | Herdering | |
| 2004/0177478 | A1 | 9/2004 | Louvel | |
| 2005/0121924 | A1 | 6/2005 | Chanya | |
| 2006/0279095 | A1 | 12/2006 | Ishiguro | |
| 2008/0163555 | A1 | 7/2008 | Thomas | |
| 2009/0058132 | A1 | 3/2009 | Browne | |
| 2013/0079984 | A1 | 3/2013 | Aerts | |
| 2013/0127185 | A1 | 5/2013 | Lang | |
| 2014/0000167 | A1 | 1/2014 | Patel | |
| 2014/0047877 | A1 | 2/2014 | Guenther | |
| 2014/0300115 | A1 | 10/2014 | Vasi | |
| 2015/0048644 | A1 | 2/2015 | Georgi | |
| 2015/0315812 | A1 | 11/2015 | Vasi | |
| 2016/0010369 | A1 | 1/2016 | Specht | |
| 2016/0208523 | A1 | 7/2016 | Bingle | |
| 2017/0066312 | A1 | 3/2017 | Coutier | |
| 2018/0163442 | A1 | 6/2018 | Soonthornwinate | |
| 2019/0078360 | A1 | 3/2019 | Blount | |
| 2019/0100948 | A1 | 4/2019 | Low | |
| 2019/0112842 | A1 | 4/2019 | Wilke | |
| 2019/0112846 | A1 * | 4/2019 | Laval | E05B 85/107 |
| 2019/0234121 | A1 | 8/2019 | Pudney | |
| 2019/0368239 | A1 | 12/2019 | Rhein | |
| 2020/0308883 | A1 | 10/2020 | Bresser | |
| 2020/0332575 | A1 | 10/2020 | Christensen | |
| 2020/0362604 | A1 | 11/2020 | Jarnicki | |
| 2021/0062558 | A1 | 3/2021 | Beck | |
| 2021/0332619 | A1 * | 10/2021 | Peterson | B60R 25/2045 |
| 2022/0042356 | A1 | 2/2022 | Herdering | |
| 2022/0243506 | A1 | 8/2022 | Moriyama | |
| 2022/0268063 | A1 | 8/2022 | Vrsecký | |
| 2022/0282533 | A1 | 9/2022 | Schütz | |
| 2022/0341226 | A1 * | 10/2022 | Sobecki | H02K 7/06 |
| 2022/0372798 | A1 * | 11/2022 | Gröver | E05B 81/06 |
| 2023/0258029 | A1 * | 8/2023 | Philippe | E05B 85/103<br>70/277 |
| 2023/0265707 | A1 | 8/2023 | Alneri | |
| 2023/0349219 | A1 | 11/2023 | Zhao | |
| 2023/0417090 | A1 * | 12/2023 | Guerin | E05C 19/022 |
| 2024/0093537 | A1 | 3/2024 | Wilke | |
| 2024/0125154 | A1 | 4/2024 | Peterson | |
| 2024/0246409 | A1 | 7/2024 | Zerbe | |
| 2024/0418018 | A1 | 12/2024 | Zhou | |

FOREIGN PATENT DOCUMENTS

| | | | | |
|---|---|---|---|---|
| CN | 109477347 | A | 3/2019 | |
| CN | 209723950 | U | 12/2019 | |
| CN | 210732313 | U | 6/2020 | |
| CN | 211549234 | U | 9/2020 | |
| CN | 112443217 | A | 3/2021 | |
| CN | 113090142 | A | 7/2021 | |
| CN | 115538871 | A | 12/2022 | |
| DE | 19642687 | A1 | 4/1998 | |
| DE | 19919251 | A1 | 11/2000 | |
| DE | 69803826 | T2 | 11/2002 | |
| DE | 10249703 | A1 | 5/2004 | |
| DE | 19740827 | B4 | 6/2006 | |
| DE | 102008019335 | A1 | 10/2008 | |
| DE | 102011017240 | A1 | 12/2011 | |
| DE | 102010053137 | A1 | 6/2012 | |
| DE | 10128866 | B4 | 8/2012 | |
| DE | 102013212083 | A1 | 1/2014 | |
| DE | 102012020710 | A1 | 4/2014 | |
| DE | 102013016885 | A1 * | 6/2014 | E05B 1/76 |
| DE | 202014101216 | U1 | 5/2015 | |
| DE | 102014103642 | A1 | 8/2015 | |
| DE | 102014109738 | A1 | 12/2015 | |
| DE | 102015209852 | A1 * | 12/2016 | E05B 85/103 |
| DE | 102016112423 | A1 | 1/2017 | |
| DE | 202017104635 | U1 | 10/2017 | |
| DE | 102016109933 | A1 | 11/2017 | |
| DE | 102016110869 | A1 | 12/2017 | |
| DE | 102017008108 | A1 | 1/2018 | |
| DE | 102017101247 | A1 | 7/2018 | |
| DE | 102017210117 | A1 * | 12/2018 | E05B 85/103 |
| DE | 102017212397 | A1 | 1/2019 | |
| DE | 202019103205 | U1 | 7/2019 | |
| DE | 102018109474 | A1 | 10/2019 | |
| DE | 102017124368 | B4 | 3/2020 | |
| DE | 102018128972 | A1 | 5/2020 | |
| DE | 102019106436 | A1 | 9/2020 | |
| DE | 102019206282 | A1 | 11/2020 | |
| DE | 202021001685 | U1 | 6/2021 | |
| DE | 102020106168 | A1 | 9/2021 | |
| DE | 102020117046 | B3 | 9/2021 | |
| DE | 102020113492 | A1 | 11/2021 | |
| DE | 102020209655 | A1 | 2/2022 | |
| DE | 102020130235 | A1 | 5/2022 | |
| DE | 102022105502 | A1 | 9/2022 | |
| DE | 102021002425 | A1 | 11/2022 | |
| DE | 202022104963 | U1 | 12/2022 | |
| DE | 102017126077 | B4 | 1/2023 | |
| DE | 202023104889 | U1 | 11/2023 | |
| DE | 102020209607 | A1 | 12/2023 | |
| DE | 102020209609 | A1 | 2/2024 | |
| DE | 202024100401 | U1 | 2/2024 | |
| DE | 202024100582 | U1 | 3/2024 | |
| DE | 202024100584 | U1 | 3/2024 | |
| DE | 102023118359 | A1 | 1/2025 | |
| EP | 0681075 | A2 | 11/1995 | |
| EP | 1081319 | A1 | 3/2001 | |
| EP | 1186734 | A1 | 3/2002 | |
| EP | 1402138 | B1 | 11/2005 | |
| EP | 1944436 | A2 | 7/2008 | |
| EP | 2032782 | B1 | 8/2010 | |
| EP | 2032783 | B1 | 8/2010 | |
| EP | 2259984 | A1 | 12/2010 | |
| EP | 3122967 | A1 | 2/2017 | |
| EP | 2808467 | B1 | 3/2017 | |
| EP | 2663705 | B1 | 7/2017 | |
| EP | 3421701 | A1 * | 1/2019 | E05B 85/107 |
| EP | 3421702 | A1 * | 1/2019 | E05B 85/107 |
| EP | 3426869 | A1 | 1/2019 | |
| EP | 2775076 | B1 | 9/2019 | |
| EP | 3620599 | A1 * | 3/2020 | E05B 85/107 |
| EP | 2646277 | B1 | 4/2020 | |
| EP | 3712362 | A1 | 9/2020 | |
| EP | 3734002 | A1 | 11/2020 | |
| EP | 3803007 | A1 | 4/2021 | |
| EP | 3322870 | B1 | 10/2021 | |
| EP | 3430217 | B1 | 1/2022 | |
| EP | 3681750 | B1 | 4/2022 | |
| EP | 4019312 | A1 | 6/2022 | |
| EP | 4258312 | A2 | 10/2023 | |
| FR | 3034802 | A1 | 10/2016 | |
| FR | 3054582 | A1 | 2/2018 | |
| FR | 3071861 | A1 | 4/2019 | |
| FR | 3096713 | A1 | 12/2020 | |

(56) References Cited

FOREIGN PATENT DOCUMENTS

| | | | |
|---|---|---|---|
| JP | S629655 | U | 1/1987 |
| JP | 2019027076 | A | 2/2019 |
| JP | 2019090196 | A | 6/2019 |
| KR | 100931160 | B1 | 12/2009 |
| WO | 9952727 | A1 | 10/1999 |
| WO | 0034604 | A1 | 6/2000 |
| WO | 0208550 | A2 | 1/2002 |
| WO | 0229184 | A1 | 4/2002 |
| WO | 2011047649 | A1 | 4/2011 |
| WO | 2012021782 | A2 | 2/2012 |
| WO | 2012151403 | A1 | 11/2012 |
| WO | 2015114154 | A2 | 8/2015 |
| WO | 2015144526 | | 10/2015 |
| WO | 2016077068 | A1 | 5/2016 |
| WO | 2017211500 | A1 | 12/2017 |
| WO | 2018219268 | A1 | 12/2018 |

* cited by examiner

ACTUATING MECHANISM FOR ACTUATING COVERS FOR VEHICLES

RELATED APPLICATION

The present application claims the benefit of German Patent Application No. 10 2022 110 008.1, filed Apr. 26, 2022, the contents of which are hereby incorporated by reference.

BACKGROUND

Door handle assemblies are used in vehicles to open and close doors or covers arranged in body openings, in particular on the vehicle exterior. Traditionally, door handle assemblies are used in particular in vehicles in which the door handle can actuate a corresponding door lock preferably purely mechanically, for example with the aid of a Bowden cable or with the aid of other force transfer elements when the door handle is actuated. Such door handles typically extend beyond the exterior of the vehicle door in order to allow the user to grip the door handle for pulling the door open.

The aforementioned purely mechanical door handles have been increasingly replaced by electric door handles, which additionally comprise a mechanical emergency unlocking element, for example on the basis of a Bowden cable. Such electrical door handles are often not limited to allowing the user to grasp them for pulling. Rather, these can be made more flexible by the electrical opening of the door lock, as only a small amount of force is then required to open the door. For this reason and for aesthetic reasons, so-called flush door handles are on the rise in newer vehicles. Flush door handles are door handles whose surface, in the resting position, lies in a plane with the outer skin of the vehicle surrounding it. Such flush door handles are already available in several design variants. The flush door handles can be subdivided into flush door handles that open outwardly and those that open inwardly.

The outwardly opening flush door handles are door handles that must be moved outwardly from the resting position into an exposed operating position prior to actuation. Accordingly, the cover of this type of flush door handle, which, in the resting position, lies flush with the surrounding body part, is pivoted into the exposed operating position and serves as a handle for opening the door in the same time.

In the case of the inwardly opening flush door handles, a door handle recess is located behind the outer surface of the vehicle. The recess is configured so that the user can engage with the recess in order to open the door. To prevent an accumulation of dirt and water and to prevent ice in the door recess, in the case of such inwardly opening flush door handles a cover is provided, which is arranged flush with the surrounding outer surface of the vehicle in the resting position of the door handle. To engage the door recess, this cover is then pushed or pivoted into the recess. This can be done either manually by the hand of the user or automatically, for example by an electric drive.

In the construction of actuating mechanisms for covers of flush door handles, it is in particular a challenge to design them so as to be electrically and simultaneously actuatable. The manual actuation option is necessary if there is a failure of the electrical actuator of the actuating apparatus for the cover. Further, it is often problematic to guarantee that the cover reliably and repeatably comes to lie flush with the outer surface of the vehicle in its closed position. This is made more difficult in particular in the case of inwardly opening flush door handles by the fact that dirt or ice can become deposited in the door handle recess, which can impair a movement of the cover into the closed position or out of the closed position.

SUMMARY

The present disclosure relates generally to actuating apparatuses for opening and closing a cover in or on a vehicle, substantially as illustrated by and described in connection with at least one of the figures, as set forth more completely in the claims. Specifically, the disclosure relates to actuating mechanisms for actuating a cover for door handles, in particular flush door handles, of a vehicle. The present disclosure further relates to vehicles having such an actuating mechanism. The present disclosure relates to actuating mechanisms for covers, in particular a door handle assembly for a vehicle, preferably a side door of a vehicle, and in particular an outer door handle assembly, although it can also be the actuation of covers for an inner door handle assembly or a door handle assembly for a trunk lid.

According to a further development of the present disclosure, the coupling comprises a first coupling element which is connected to the drive shaft in a form-fit manner and a second coupling element connected to the cover, and wherein the two coupling elements are rotatable in relation to one another and, in particular, biased into a home position by a spring.

By biasing the two coupling elements into a home position, it is achieved that the actuating mechanism, even without actuation of the electric motor, can be used in order to hold the cover in a neutral position (home position), for example the closed position. According to this aspect, any movement of the cover will occur counter to the aforementioned biasing.

According to a further aspect, the coupling is configured such that a rotational movement of the first coupling element, in the normal state of the coupling, is transferred to the second coupling element via the spring, in particular an annular spring. By providing a spring between the first and second coupling elements, it is achieved that the torque transferred to the cover by the electric motor increases successively, in particular continuously, when there is a hindrance to the movement of the cover. This has the advantage that the increase in torque in the normal state is continuous and not abrupt, whereby damage to the actuating mechanism due to hindrances such as dirt or ice can be prevented.

According to a further aspect, the coupling is configured such that a resistance against a movement of the cover results in rotation of the coupling elements in relation to one another and an increase in the spring tension until the first torque is reached. This increases the torque that is transferable by the spring to the aforementioned first torque threshold. In this aspect, the spring can be an annular spring connecting the two coupling elements to one another.

According to a further aspect, the coupling is configured such that a manual movement of the cover causes a rotation of the second coupling element in relation to the first coupling element counter to the biasing of the spring. Accordingly, the spring of the coupling performs a dual function. On the one hand, when the cover is actuated by the electric motor, it serves as a force transfer element between the two coupling elements. On the other hand, it allows the cover to be pivoted manually counter to the direction of operation of the electric motor without damaging it.

According to a further aspect, the first coupling element comprises a first protrusion having a first and an opposite second spring abutment face, and wherein a first end of the spring is biased against the first spring abutment face and a second end of the spring is biased against the second spring abutment face. Such a design of the first coupling element allows the spring to be biased in both directions, i.e., the opening and closing directions of the cover.

According to a further aspect, the second coupling element comprises a second protrusion having a first and an opposite second spring abutment face, and wherein a first end of the spring is biased against the first abutment face and a second end of the spring is biased against the second abutment face.

According to a further aspect, the first and second protrusions are arranged so as to radially overlap one another in the home position. In this way, it is possible to bias both coupling elements into the home position in both directions of rotation with a spring, in particular an annular spring.

The first and second protrusions can have substantially identical widths. This allows for a very simple assembly of the annular spring on the abutment faces of the protrusions.

According to a further aspect, the second coupling element comprises a first stop which, in the emphatic state of the coupling, is in force-fit communication with the second coupling element, in particular with a first stop face of the second coupling element. In other words, the coupling is configured so as to transfer in the normal state a rotational movement of the drive shaft to the cover via the spring. In order to limit a tension of the spring to a particular spring travel and thus prevent plastic deformation of the spring, the coupling according to this aspect comprises a first stop. The first stop is arranged on the first coupling element such that it contacts the second coupling element in a form-fit manner after the first torque is exceeded and thereafter (i.e., in the emphatic state) takes over the transfer of the rotational movement from the drive shaft to the cover. In other words, as soon as the first stop is in communication with the second coupling element, there is no further relative movement between the coupling elements, which also limits a further tensioning of the spring.

According to a further aspect, the coupling is configured such that the first stop does not contact the second coupling element until the first torque threshold is exceeded. Thus, it is guaranteed that the transferred torque is continuously increased (i.e., not abruptly) up to the first torque threshold through the biasing of the spring. Only when the first torque is exceeded does the form-fit contacting of the two coupling elements occur, whereby the transferred torque is no longer limited by the coupling. A limitation can then be provided, for example via a further coupling in the electric motor.

According to a further aspect, the actuating mechanism comprises a control apparatus configured so as to shut down the drive when the cover is in its closed position. By automatically shutting down the drive (for example, the electric motor) in the closed position, it is achieved that the coupling is automatically converted to its normal state even when the emphatic state was necessary in order to close the cover. Thus, the cover is always held by the actuating mechanism in the closed position only through the biasing of the spring, whereby a manual pivoting of the cover is possible at any time.

The actuating mechanism can comprise a sensor for detecting the closed position of the cover. For example, this can be a microswitch that detects the rotational position of the second coupling element. This sensor can be connected to the control apparatus, whereby it can detect the closed position.

According to a further aspect, the present disclosure relates to door handle assembly, in particular for a flush door handle, for insertion into a body opening of a vehicle, wherein the door handle assembly comprises a recess, a cover for closing the recess, and an actuating mechanism.

In a further aspect, the present disclosure relates to a vehicle having the aforementioned door handle assembly.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

The present disclosure addresses the problem of specifying an actuating mechanism for covers, in particular for covers of flush door handles, by which the cover can be reliably and repeatably moved into a specified (in particular flush) closed position. The actuating mechanism is intended to enable electrical as well as manual actuation.

Accordingly, the disclosure relates to an actuating mechanism for actuating covers for vehicles, in particular covers for flush door handles, wherein the cover is reversibly movable, and in particular pivotable, between a closed position and an opened position, wherein the actuating mechanism comprises the following: a drive, in particular in the form of an electric motor, having a drive shaft; and a kinematics associated with the drive, which kinematics is configured so as to tap a rotational movement from the drive shaft when the drive is actuated and convert it into a movement, in particular a pivoting, of the cover, a coupling, wherein the coupling has a normal state, in which a torque of the drive shaft is transferred to the cover continuously increasing up to a first torque threshold, and an emphatic state, in which the torque of the drive shaft is transferred to the cover abruptly up to a second torque threshold, wherein the second torque threshold is higher than the first torque threshold.

Due to the coupling with a normal state and an emphatic state, it is achieved that, under normal conditions, i.e., when no dirt or ice prevents the cover from moving or the cover is already in the closed position, an easy actuation of the cover is possible, regardless of whether the actuation is a manual actuation or an actuation by an electric drive. If, however, the movement is hindered, for example by dirt, the coupling is, preferably automatically, transferred to the emphatic state, in which the movement of the cover can be abruptly carried out at a larger torque in order to “force” the cover into the desired position. Thus, a secure closing of the cover is also guaranteed even when there is minor dirtying or icing of the recess.

Of course, the emphatic state should also be limited to a certain torque in order to prevent damage to the cover or the electric motor. As will be explained in further detail later on, this can be enabled, for example, by a further coupling within the electric motor, which results in a decoupling above the second torque threshold.

Figure 1A:
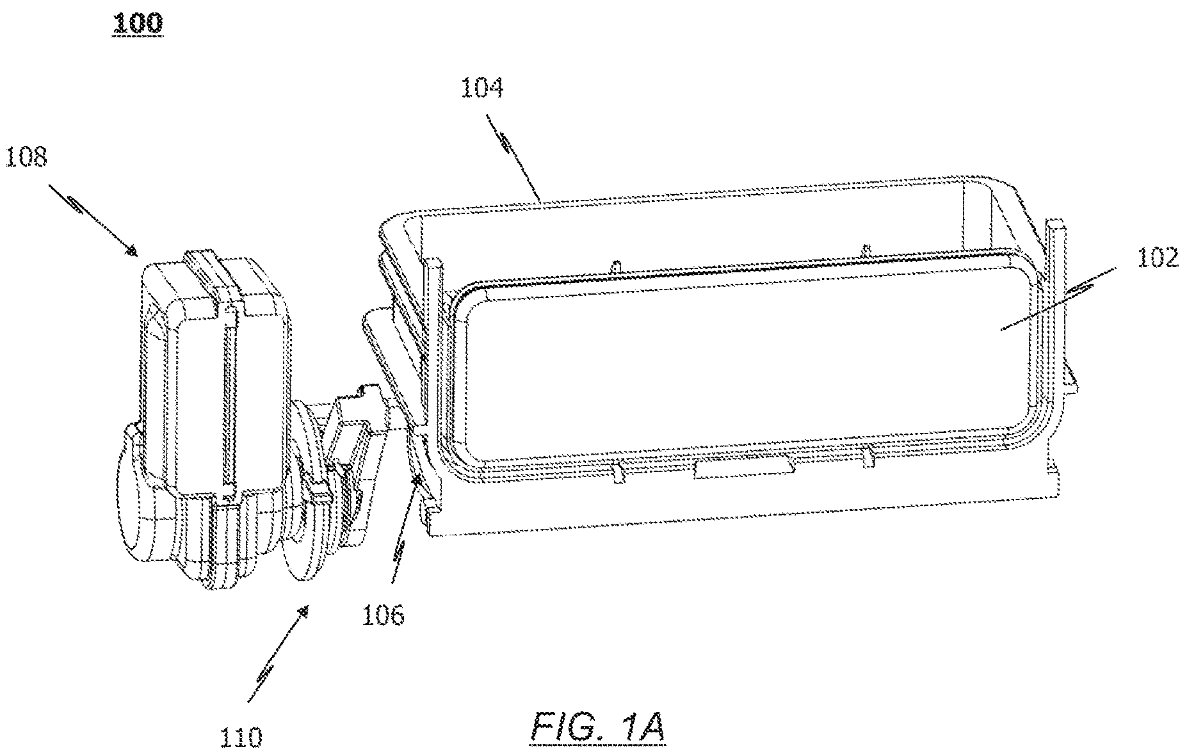
FIG. 1A a schematic perspective view of an actuating mechanism according to an aspect of the present disclosure.
Figure 3A:
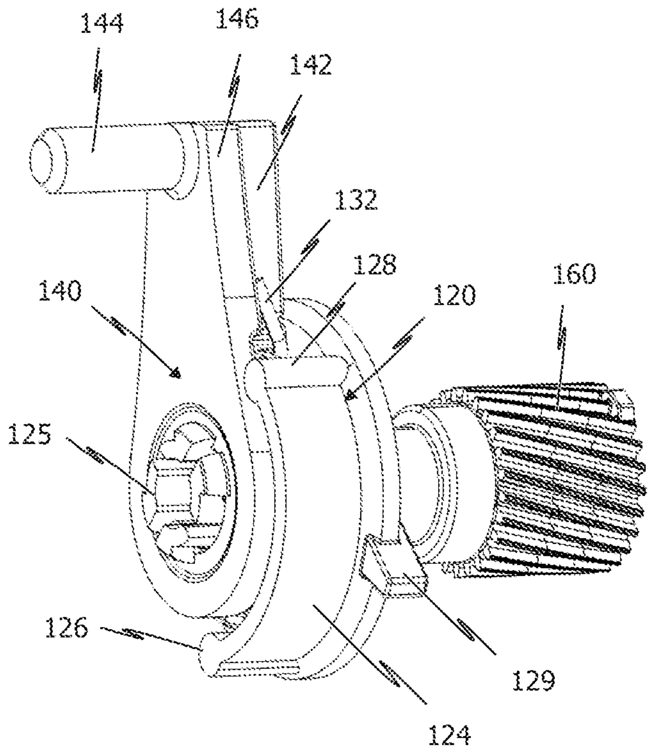
FIG. 3A a perspective view of the coupling and drive shaft of the actuating mechanism from FIG. 1A from the front.
Figure 3B:
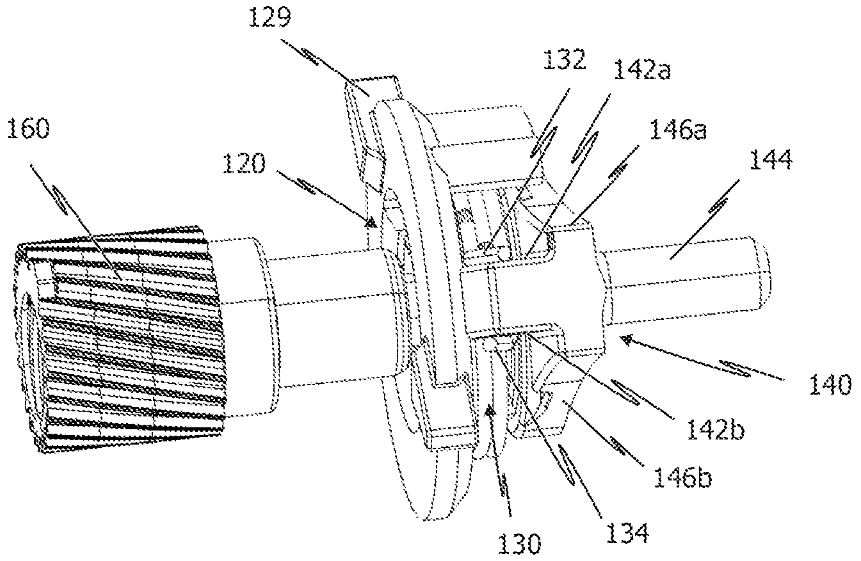
FIG. 3B a perspective view of the coupling from FIG. 3A from above.

FIG. 1A shows a schematic perspective view of an actuating mechanism 100 according to an aspect of the present disclosure. The actuating mechanism 100 comprises a drive 108, which is shown in particular as an electric motor having a drive shaft (see in particular FIGS. 3A and 3B).

The drive 108 is connected to a pivoting apparatus 106 via a coupling 110 in order to pivot a cover 102. The pivoting apparatus 106 serves to close the cover 102 in a door handle recess 104 between a closed position (FIG. 1A) and an opened position (FIG. 6A) and back. The door handle recess 104 is mounted by insertion into an inner surface of the outer skin of a vehicle. The recess 104 is arranged opposite the outer skin such that the cover 102 of the recess 104 is flush with the outer surface of the vehicle as long as the cover 102 remains in its closed position. However, the outer surface of the vehicle is not shown in FIG. 1A.

The cover 102 shown herein is a cover for a flush door handle, in particular for an inwardly opening door handle.

The pivoting of the cover 102 can be accomplished with the actuating mechanism 100 according to FIG. 1A in two ways. On the one hand, the cover 102 can be moved between its opened position and its closed position by the drive 108. For this purpose, a rotational movement provided by the drive is transferred to the pivoting apparatus 106 and thus to the cover 102 via the coupling 110. On the other hand, the cover 102 can be manually pivoted, for example, when the drive 108 is out of service. To manually pivot the cover 102, the user pushes against the cover 102, which can be moved inwardly, i.e., towards the opened position due to the coupling 110.

In some examples, the kinematics between the drive 108 and the cover 102 is equipped with a microswitch that responds as soon as the cover has been transferred into the opened position. This information of the microswitch can thus be used in order to electrically unlock the door lock. In addition, it is irrelevant whether the pivoting of the cover 102 into the opened position was performed manually or by the drive 108. Thus, as soon as the cover 102 is in the opened position, the door of the vehicle is automatically unlocked, allowing the user to now pull open the door (for example, by engaging with the door recess 104).

The actuating mechanism can comprise a sensor system that monitors the proximity of the user. For example, this sensor system can be configured so as to detect the hand of the user or a vehicle key and automatically open the cover 102 using the drive 108. In other words, the cover 102 opens even before the user engages with the door handle. Thus, the user does not typically need to actuate the cover 102.

The actuating mechanism 100 can further be used in order to transfer the cover 102 back into its closed position. This can be done automatically, for example, as soon as the user or vehicle key can no longer be detected in a certain proximity. Alternatively, a pivoting of the cover 102 into the closed position can occur even after a certain period of time has elapsed after opening or after startup of the vehicle.

A pivoting into the closed position is performed according to the example of the actuating mechanism shown in FIGS. 1A to 9B, normally automatically by an annular spring provided in the coupling, as soon as the drive 108 configured as an electric motor is shut down. However, in some instances, a closing of the cover 102 by the spring force alone is not possible, because dirt or ice in the door handle recess 104 make it difficult or prevent the cover 102 from pivoting. In this case, the coupling 110 of the actuating mechanism 100 has an emphatic state, via which a sudden increase in the torque transferred to the pivoting apparatus 106 can be achieved.

The aforementioned actuating mechanism functions are described in further detail below with reference to FIGS. 1B to 9B.

Figure 1B:
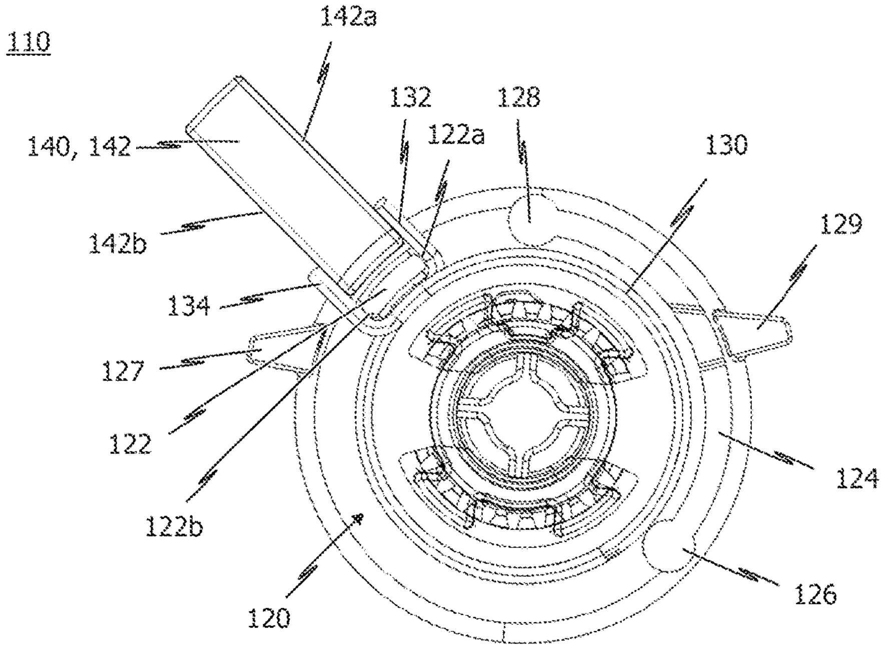
FIG. 1B a cross-section through the coupling of the actuating mechanism from FIG. 1B in the home position.
Figure 2:
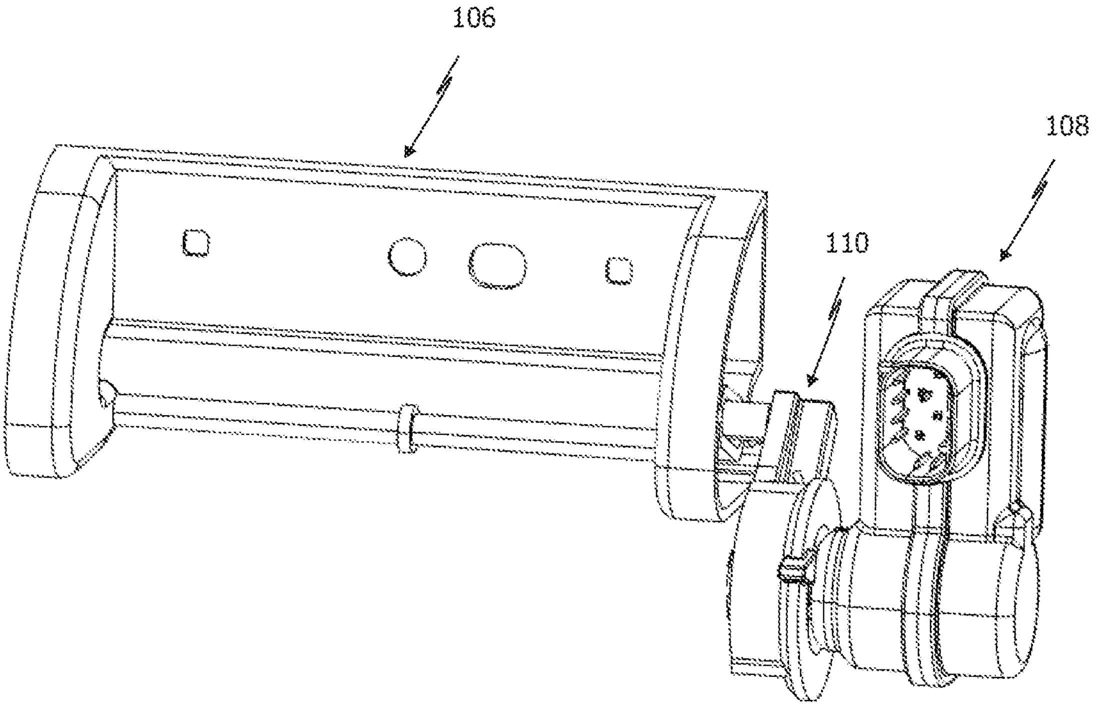
FIG. 2 a schematic view of the actuating mechanism from FIG. 1A from the rear.

FIG. 1B shows a cross-section through the coupling 110 in the home position according to FIG. 1A. In the home position of the coupling, the cover 102 is in the position shown in FIG. 1A.

Figure 4:
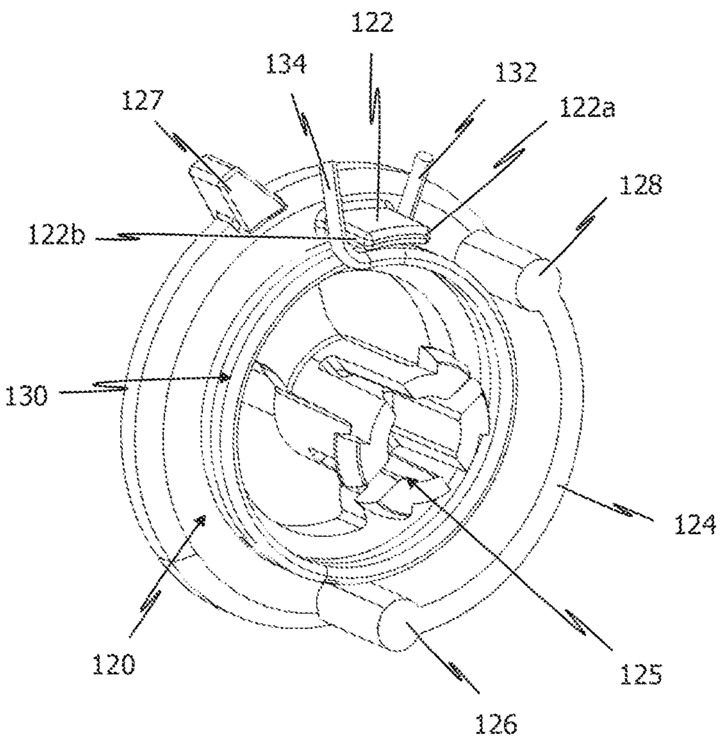
FIG. 4 a perspective view of the first coupling element with the spring.
Figure 5:
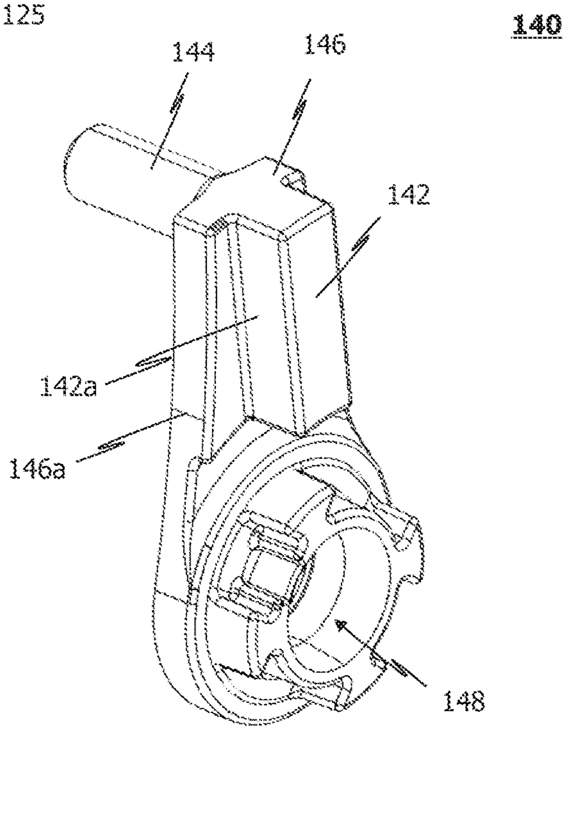
FIG. 5 a perspective view of the second coupling element.

The coupling 110 comprises a first coupling element 120 and a second coupling element 140, as shown better in FIGS. 4 and 5, in particular. The two coupling elements 120, 140 are arranged so as to be rotatable in relation to one another. The second coupling element 140 has a through-opening 148 configured so as to accommodate an axis 125 of the first coupling element 120. In other words, the second coupling element 140 is rotatably supported on the axis 125 of the first coupling element 120.

On the side of the first coupling element 120 opposite the axis 125, there is a plug connector that can be inserted into the drive shaft 160 of the drive 108 in order to provide a form fit in the direction of rotation of the drive shaft 160 between the first coupling element 120 and the drive 108. In other words, the first coupling element 120 is configured so as to be connected to the drive shaft 160 of the drive 108 in a form-fit manner such that the first coupling element 120 always moves together with the drive shaft 160. A transfer of a torque of the first coupling element 120 to the second coupling element 140 may not occur via the axis 125. Rather, in the normal state of the coupling, the annular spring 130 is provided for this purpose.

For example, the annular spring 130 is shown in FIG. 4. The windings of the annular spring extend between a first end 132 and a second end 134.

The first coupling element 120 has a first protrusion 122. The protrusion 122 extends towards the second coupling element 140. The first protrusion 122 of the first coupling element 120 has a first spring abutment face 122*a* and an opposite second spring abutment face 122*b*. The two ends 132, 134 of the annular spring 130 are biased against the spring abutment faces 122*a*, 122*b*. In particular, a first end 132 of the annular spring 130 is biased against the first spring abutment face 122*a* of the first coupling element 120. A second end 134 of the annular spring 130 is biased against the second spring abutment face 122*b* of the first protrusion 122.

The second coupling element 140 also has a protrusion 142 that extends towards the first coupling element 120 in the installed state of the coupling 110. The second protrusion 142 of the second coupling element 140 has a first spring abutment face 142*a* and a second spring abutment face 142*b* opposite the first spring abutment face 142*a*.

As shown in FIG. 1B, the first end of the annular spring 130 abuts against the first spring abutment face 142*a* of the second protrusion 142. The second end 134 of the annular spring 130 abuts against the second spring abutment face 142*b* of the second protrusion in the home position. It should be noted at this point that in FIG. 1B, only the second protrusion 142 of the second coupling element 140 can be seen. The remaining portion of the second coupling element 140 extends out of the plane shown in FIG. 1B.

The coupling 110 of the actuating mechanism 100 according to the example shown in FIG. 1A is biased by the annular spring 130 in the example shown in FIG. 1B. In this home position, the two protrusions 122, 142 of the first and second coupling elements 120, 140 are arranged so as to radially overlap one another, as can be seen in FIG. 1B. In other words, the first end 132 of the annular spring 130 is simultaneously tensioned against the first spring abutment faces 122*a*, 142*a* of the two protrusions 122, 142. Simultaneously, the second end 134 of the annular spring 130 is tensioned against the two second spring abutment faces 122*b*, 142*b* of the two protrusions 122, 142. In other words, a relative rotational movement of the two coupling elements 120, 140 always occurs counter to the biasing of the annular spring 130, as will be explained in further detail with reference to FIGS. 6A to 9B. It is also noted that the two protrusions 122, 142 are preferably equally wide (FIG. 1B) in order to form a smooth abutment face for the ends 132, 134 of the annular spring 130.

Returning to FIGS. 3A to 5, it is noted that the first coupling element comprises a stop element 124. In the installed state, the stop element 124 extends toward the second coupling element 140, as does the first protrusion 122. The stop element 124 serves to transfer a rotational movement of the first coupling element 120, in the emphatic state, directly to the second coupling element 140 (i.e., without interposition of the annular spring 130).

The stop element 124 has a first stop 126 and a second stop 128. The first stop 126 and the second stop 128 are configured so as to contact corresponding abutment faces 146*a*, 146*b* after a specified relative movement of the two coupling elements 120, 140 in relation to one another has occurred. The first stop 126 is configured so as to contact a first stop face 146*a* of the second coupling element 140 during a closing movement. The second stop 128 is configured so as to contact a second stop face 146*b* of the second coupling element during the opening movement.

The first coupling element 120 comprises end stops 127, 129 that extend radially outward and are configured so as to prevent a respective movement of the first coupling element beyond the opened position or beyond the closed position.

Figure 6A:
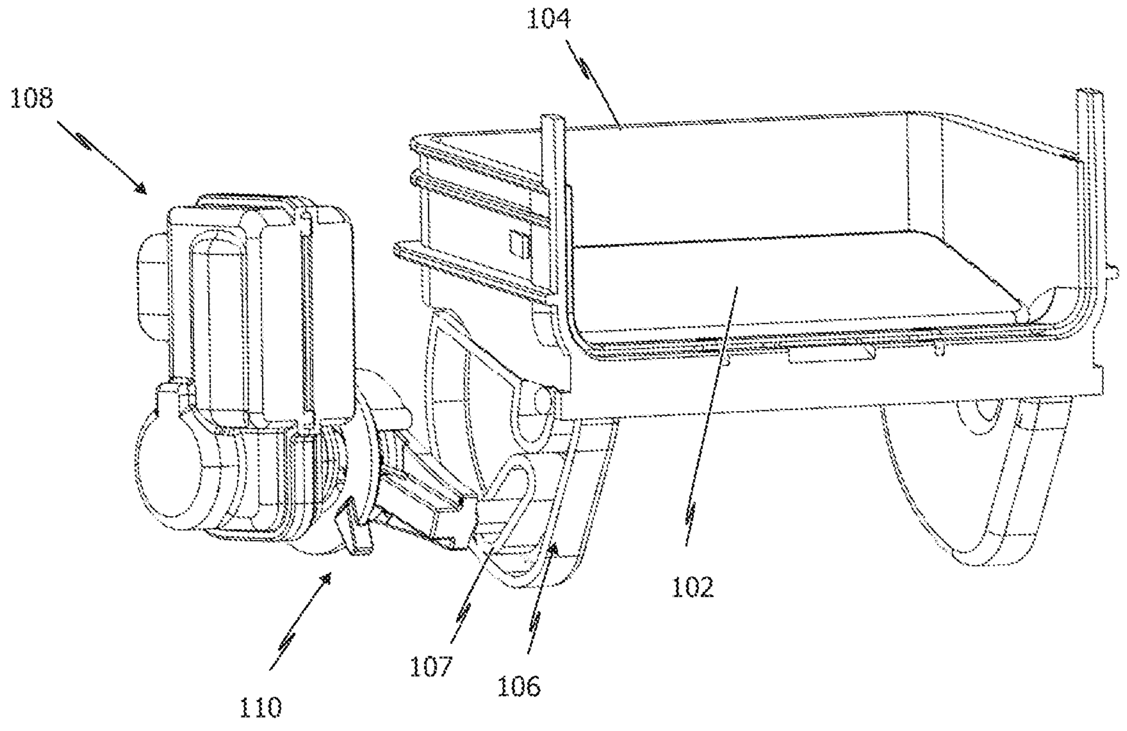
FIG. 6A a perspective view of the actuating mechanism according to FIG. 1A in an opened position.
Figure 6B:
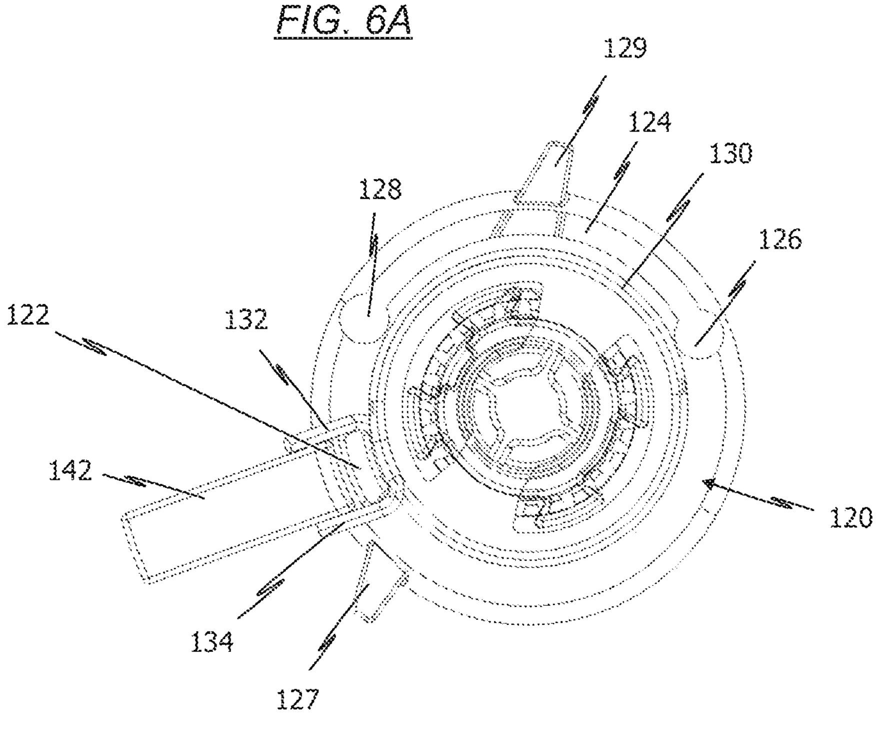
FIG. 6B a cross-section through the coupling in the position according to FIG. 6A.

As shown in particular in FIG. 5, the second coupling element 140 comprises a guide pin 144 that is configured so as to be inserted into a corresponding oblong hole 107 of the pivoting apparatus 106 (for example FIG. 6A). The guide pin 144 transfers the rotational movement of the second coupling element 140 to the pivoting apparatus 106. The guide pin 144 extends in a direction opposite the first coupling element 120.

As mentioned above, the home position of the actuating mechanism 100 is shown in FIGS. 1A and 1B. In this home position, the cover 102 is in its closed position. In some examples, the drive 108 is configured so as to open the cover 102 as soon as the user is in proximity to the door handle. As mentioned above, this can be achieved, for example, by detecting the vehicle key. The drive will then generate a rotational movement, which can be seen, for example, from the comparison of FIGS. 1B and 6B. The rotational movement of the drive 108 to open the cover 102 is a counter-clockwise direction of rotation according to the cross-section of FIGS. 1B and 6B. In other words, the rotation of the drive shaft 160 of the drive 108 causes a rotation of the first coupling element 120 counter-clockwise in relation to FIGS. 1B and 6B. This rotational movement is transferred to the second coupling element 140 in the normal state of the coupling (i.e., when there is no significant resistance against the opening of the cover 102) via the annular spring 130. In particular, when the first coupling element rotates in a counter-clockwise direction, the second spring abutment face 122*b* of the first protrusion 122 is pressed against the second end 134 of the annular spring 130. Because there is no significant resistance against the rotational movement of the second coupling element 140, there is no deformation of the annular spring 130, such that the first end 132 of the annular spring transfers the rotational movement of the first coupling element 120 via the first spring abutment face 142*a* of the second protrusion 142 to the second coupling element 140. In other words, the two coupling elements 120, 140 move counter-clockwise together as long as there is no resistance against the opening movement of the cover 102. The opened state can be seen in FIGS. 6A and 6B.

Figure 7A:
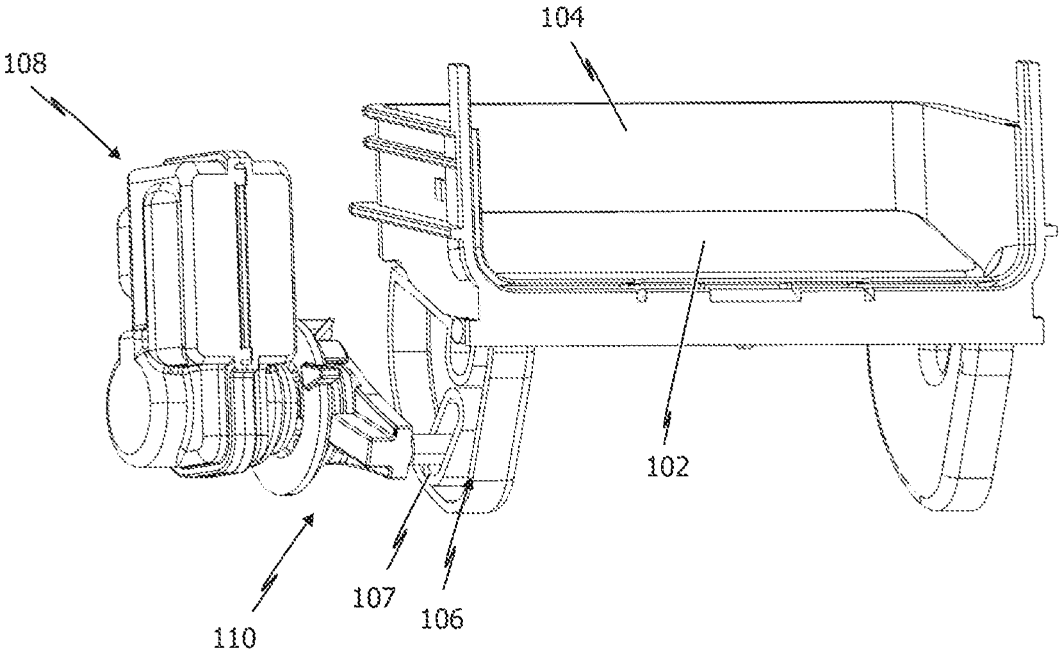
FIG. 7A a perspective view of the actuating mechanism according to FIG. 1A in the opened position with resistance against the movement of the cover.
Figure 7B:
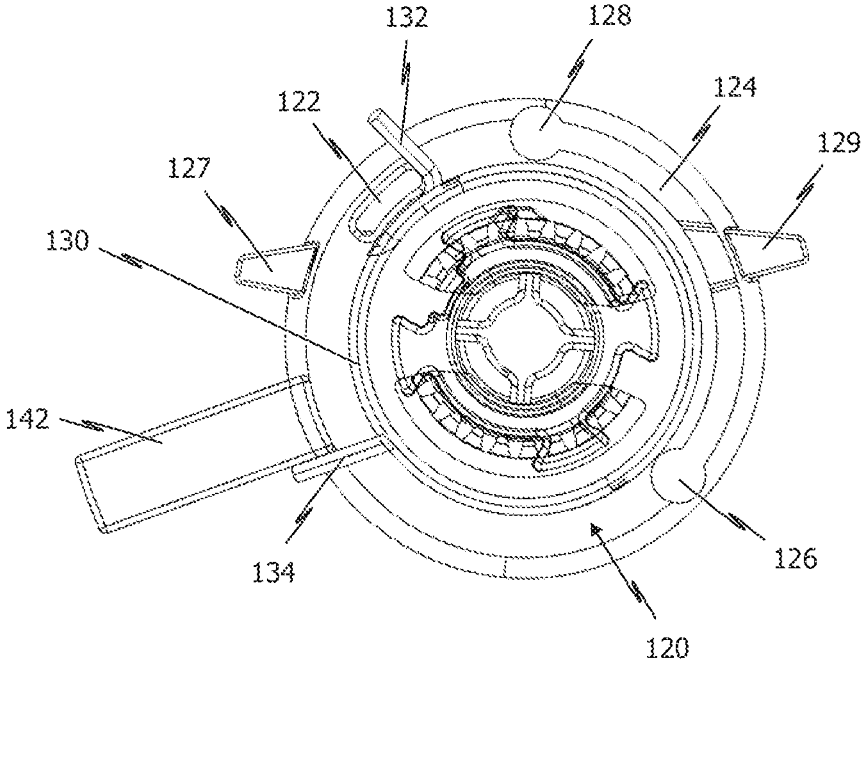
FIG. 7B a cross-section through the coupling according to FIG. 7A.

FIGS. 7A and 7B (still in the normal state) show the actuating mechanism in a situation where the drive 108 is attempting to close the cover 102, but there is resistance against the closing movement of the cover (for example, due to icing). In this situation, the drive has returned the first coupling element 120 to its home position by a clockwise rotation. Because the cover 102 that is in communication with the second coupling element encounters resistance, the second coupling element also cannot follow the rotational movement of the first coupling element. Rather, a tensioning of the annular spring 130 is achieved by the resistance now perceived. The first spring abutment face 122*a* of the first protrusion 122 pushes against and shifts the first end of the annular spring 132 in a clockwise direction. At the same time, the second end 134 of the annular spring 130 remains at the second spring abutment face 142*b* of the second protrusion 142, whereby the spring 130 is increasingly tensioned, and the torque increases continuously. In the example of FIGS. 7A and 7B, the torque achieved by this further tensioning of the spring 130 is not sufficient in order to release the cover against the resistance. Thus, the drive 108 continues to rotate the first coupling element 120 clockwise in relation to the second coupling element 140. The torque thus achieved remains below the first torque threshold, i.e., the coupling is still in its normal state in the position according to FIGS. 7A to 7B.

Figure 8A:
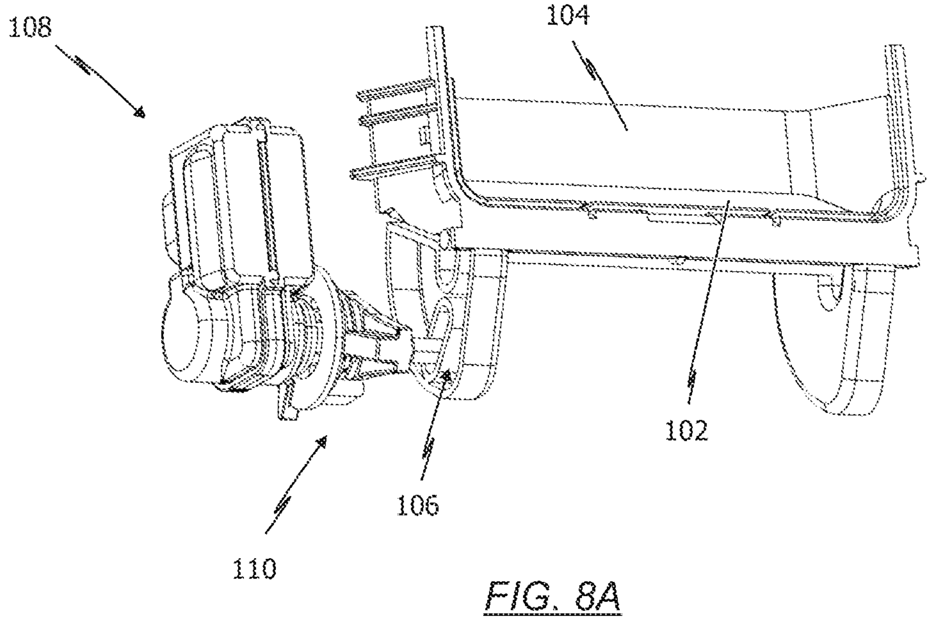
FIG. 8A a perspective view of the actuating mechanism according to FIG. 1A in the opened position with resistance against the movement of the cover.
Figure 8B:
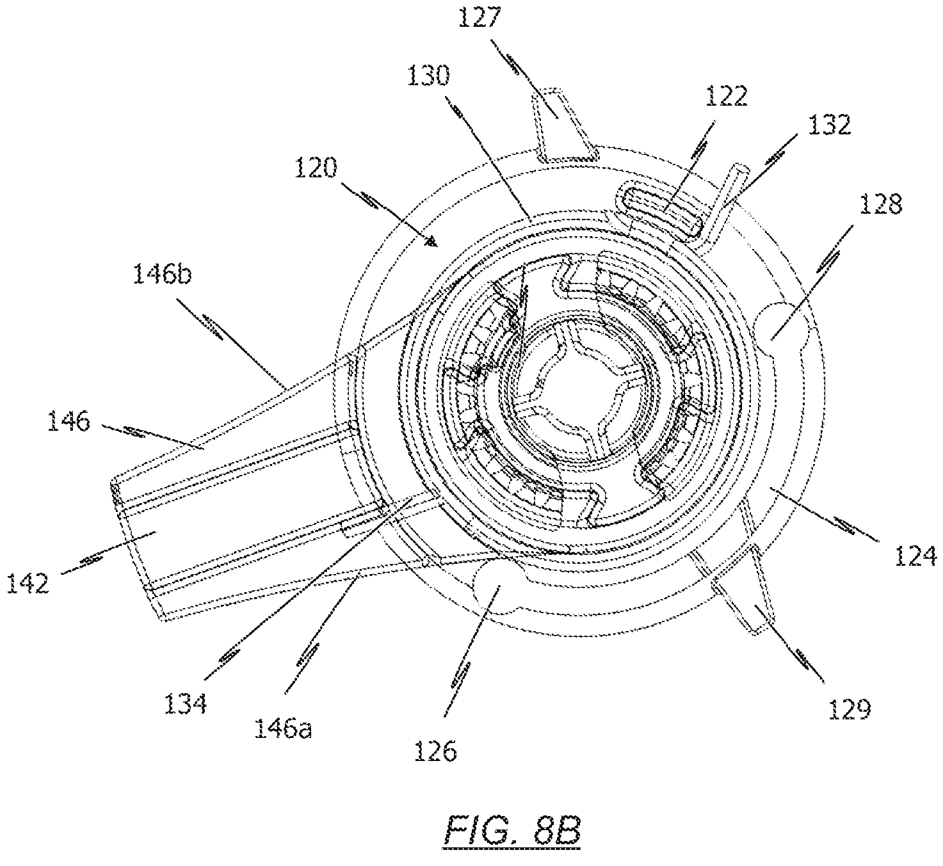
FIG. 8B a cross-section through the coupling according to FIG. 8A.

By further twisting the first coupling element 120, the first protrusion 122 is rotated even further clockwise in relation to the second protrusion 142 of the second coupling element 140 (FIG. 8B). Thus, a further tensioning of the annular spring 130 and thus a continuous increase in the torque is achieved, which is transferred to the second coupling element 140 by the spring 130. However, in the example shown here, this torque is also not sufficient to exceed the resistance against the movement of the cover 102. Thus, the cover 102 also remains in the opened position here (FIG. 8A).

In the rotation of the two coupling elements as shown in FIG. 8B, the two protrusions 122, 142 are rotated approximately 120° in relation to one another. Between the home position according to FIGS. 1B and 6B and the position in FIG. 8B, the torque transferred to the second coupling element 140 is continuously increased, because the annular spring 130 has been increasingly tensioned from 0 to 120°. In other words, the spring travel has continued to grow between the positions in FIGS. 6B and 8B. In the position according to FIG. 8B, a first torque threshold is finally achieved, from which a further tensioning of the spring could lead to a plastic deformation. Nevertheless, the resistance against the movement of the cover is still higher than the forces generated at the first torque threshold, so that the second coupling element 140 continues to remain in its opened position.

To allow for an emphatic push and ultimately force the cover 102 against the resistance into its closed position, the coupling shown in the figures has an emphatic state. In this emphatic state, the transferred torque is increased abruptly. In the example shown in the figures, this is achieved in particular by the first stop 126 of the coupling 110. In the rotation of the two coupling elements 120, 140 as shown in FIG. 8B, the first stop 126 comes into contact with the first stop face 146*a* of the second coupling element 140. From this point on, a further rotational movement of the first coupling element 120 in the clockwise direction is transferred to the second coupling element 140 directly via the first stop 126. There is no further tensioning of the annular spring 130. The torque now transferred is now limited only by the resistance against the pivoting of the cover 102 or by another locking coupling of the drive 108. Accordingly, due to the force-fit connection of the two coupling elements in the emphatic state shown in FIG. 8B, a sudden increase in torque is achieved. Accordingly, this serves to also move the cover 102 into its closed position against the resistance. However, as noted above, the torque of the emphatic state can be limited by a locking coupling of the drive 108 to a second torque threshold if the resistance against the movement of the cover 102 is so high that it could result in damage to the actuating mechanism. In other words, if the torque transferred by the stop 126 exceeds the second torque threshold, a second coupling (e.g., locking coupling in the drive) should be decoupled, preventing further damage. In this case, i.e., if the second torque threshold is exceeded, a warning signal could be given to the user simultaneously or alternatively, which could then eliminate the blocking.

Figure 9A:
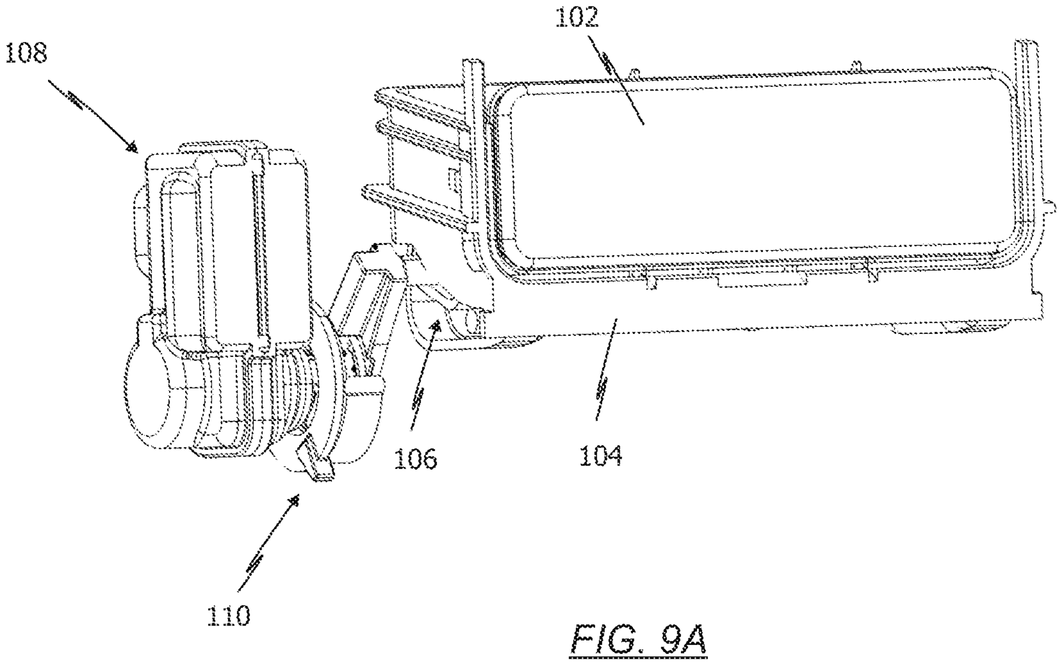
FIG. 9A a perspective view of the actuating mechanism according to the aspect from FIG. 1A in the closed position of the cover in the emphatic state.
Figure 9B:
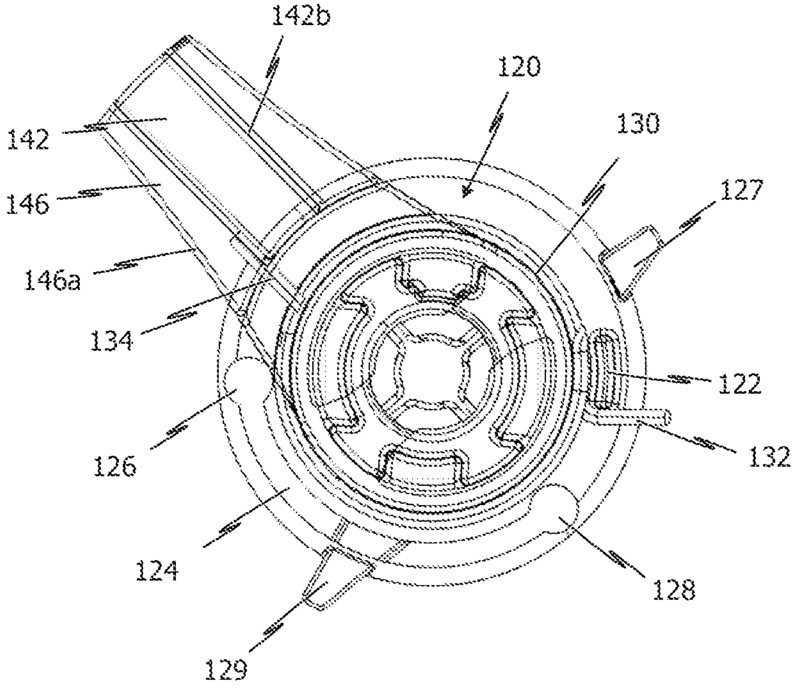
FIG. 9B a cross-section through the coupling according to FIG. 9A.

In the situation shown in FIGS. 9A and 9B, the resistance has been overcome by abruptly increasing the torque in the emphatic state, so that the second coupling element 140 has eventually been transferred back into its home position, which corresponds to the closed position of the cover 102.

As shown in FIG. 9B, the two coupling elements 120, 140 initially remain in their rotated position in this state as well. In other words, even in this state, the annular spring 130 is still under full tension. In this state, on the one hand, the annular spring attempts to move the second coupling element 140 further in the clockwise direction, but this is prevented by the end stops. On the other hand, the annular spring attempts to rotate the first protrusion 122 of the first coupling element 120 counter-clockwise via its first end 132. This is not possible as long as the drive 108 generates a torque for closing the cover. However, as soon as the closed position of the cover 102 is reached, the drive 108 can be shut down automatically (for example, by a control apparatus), so that the annular spring 130 can automatically rotate the first coupling element 120 back into the home position shown in FIG. 1B.

Finally, it is noted that the cover 102 in the home position of the coupling 110 as shown in FIG. 1B can also be pivoted manually inwardly, i.e., towards the opened position. For this purpose, the user simply needs to push the cover 102 into the recess 104. Such a manual actuation results in the second coupling element being rotated in relation to the first coupling element 120 while tensioning the annular spring 130. With reference to FIG. 1B, the second protrusion 142 of the second coupling element 140 would then rotate counter-clockwise, while the first protrusion 122 of the first coupling element remains in its position shown in FIG. 1B. This relative movement between the two protrusions 122, 142 and the associated possibility of manual pivoting is enabled by the annular spring 130. In this example, it is tensioned by the second spring abutment face 142*b* of the second protrusion 142 while the first end 132 remains at the first spring abutment face 122*a* of the first protrusion 122.

As soon as the user withdraws their hand from the recess 104, the cover 102 is moved back into the closed position by the spring force of the annular spring 130.

The disclosure is not limited to the examples shown in the drawings, but results when all of the features disclosed herein are considered together. In particular, the actuating mechanism of the present disclosure is not limited to the described application for flush door handles. Rather, the actuating mechanism is also suitable for other covers, such as fueling, charging, or servicing flaps of vehicles.

What is claimed is:

1. An actuating mechanism for actuating a cover for a flush door handle of a vehicle, wherein the cover is pivotably movable between a closed position and an opened position, the actuating mechanism comprising:

an electric motor, having a drive shaft;

a pivoting apparatus configured to couple to the cover, wherein a rotational movement from the drive shaft is transferred to the pivoting apparatus via a coupling to pivot the cover, wherein the coupling has a normal state, in which a torque of the drive shaft is transferred to the cover continuously increasing up to a first torque threshold, and an emphatic state, in which the torque of the drive shaft is transferred to the cover and abruptly increased up to a second torque threshold, wherein the second torque threshold is higher than the first torque threshold;

wherein the coupling comprises a first coupling element which is connected to the drive shaft in a form-fit manner and a second coupling element connected to the cover, and wherein the first and second coupling elements are rotatable in relation to one another and biased into a home position by a spring; and wherein the first coupling element comprises a first protrusion having a first spring abutment face and an opposite second spring abutment face, and wherein a first end of the spring is biased against the first spring abutment face of the first protrusion and a second end of the spring is biased against the second spring abutment face of the first protrusion.

2. The actuating mechanism according to claim 1, wherein the coupling is configured such that a rotational movement of the first coupling element, in the normal state of the coupling, is transferred to the second coupling element via the spring, and wherein the spring is an annular spring.

3. The actuating mechanism according to claim 2, wherein the coupling is configured such that a resistance against a movement of the cover results in a rotation of the coupling elements in relation to one another and an increase in the spring tension until the first torque threshold is reached.

4. The actuating mechanism according to claim 1, wherein the coupling is configured such that a manual movement of the cover causes a rotation of the second coupling element in relation to the first coupling element counter to the biasing of the spring.

5. The actuating mechanism according to claim 1, wherein the second coupling element comprises a second protrusion having a first spring abutment face and an opposite second spring abutment face, and wherein the first end of the spring is biased against the first spring abutment face of the second protrusion and the second end of the spring is biased against the second spring abutment face of the second protrusion.

6. The actuating mechanism according to claim 5, wherein the first and second protrusions are arranged so as to radially overlap one another in the home position.

7. The actuating mechanism according to claim 5, wherein the first and second protrusions have a substantially identical width.

8. The actuating mechanism according to claim 1, wherein the first coupling element comprises a first stop which, in the emphatic state of the coupling, is in force-fit communication with a first stop face of the second coupling element.

9. The actuating mechanism according to claim 8, wherein the coupling is configured such that the first stop does not contact the second coupling element until the first torque threshold is exceeded.

10. The actuating mechanism according to claim 1, wherein the actuating mechanism comprises a sensor for detecting the closed position of the cover, and wherein the actuating mechanism comprises a control apparatus configured to shut down the electric motor when the cover is in its closed position.

11. A flush door handle assembly for insertion into a body opening of a vehicle, the flush door handle assembly comprising a recess, a cover for closing the recess, and an actuating mechanism according to claim 1.

12. A vehicle comprising a flush door handle assembly according to claim 11.

13. An actuating mechanism for actuating a cover for a flush door handle of a vehicle, wherein the cover is pivotably movable between a closed position and an opened position, the actuating mechanism comprising:

an electric motor having a drive shaft;

a pivoting apparatus configured to couple to the cover, wherein a rotational movement from the drive shaft is transferred to the pivoting apparatus via a coupling to pivot the cover;

wherein the coupling has a normal state, in which a torque of the drive shaft is transferred to the cover continuously increasing up to a first torque threshold, and an emphatic state, in which the torque of the drive shaft is transferred to the cover and abruptly increased up to a second torque threshold, wherein the second torque threshold is higher than the first torque threshold;

wherein the coupling comprises a first coupling element which is connected to the drive shaft in a form-fit manner and a second coupling element connected to the cover, and wherein the first and second coupling elements are rotatable in relation to one another and biased into a home position by a spring; and wherein the first coupling element comprises a first stop which, in the emphatic state of the coupling, is in force-fit communication with a first stop face of the second coupling element.

14. The actuating mechanism according to claim 13, wherein the coupling is configured such that a resistance against a movement of the cover results in a rotation of the coupling elements in relation to one another and an increase in the spring tension until the first torque threshold is reached.

15. The actuating mechanism according to claim 13, wherein the coupling is configured such that a manual movement of the cover causes a rotation of the second coupling element in relation to the first coupling element counter to the biasing of the spring.

16. The actuating mechanism according to claim 13, wherein the coupling is configured such that the first stop does not contact the second coupling element until the first torque threshold is exceeded.

17. A flush door handle assembly for insertion into a body opening of a vehicle, the flush door handle assembly comprising a recess, a cover for closing the recess, and an actuating mechanism according to claim 13.

18. A vehicle comprising a flush door handle assembly according to claim 17.

* * * * *